United States Patent Office 3,372,066
Patented Mar. 5, 1968

3,372,066
COATED CARBIDE PARTICLES
Joseph F. Quaas, Island Park, N.Y., assignor to Eutectic Welding Alloys Corporation, a corporation of New York
No Drawing. Filed May 6, 1964, Ser. No. 365,503
17 Claims. (Cl. 148—24)

This invention relates to a coated refractory carbide particle and compositions obtained therefrom. More particularly the invention relates to a refractory carbide particle which has been coated with a fluxing and protecting agent and a rod composition containing such particles useful in forming hard facings and cutting edges.

Refractory carbides of varying particle size depending on ultimate utilization are used in various industries to provide hard facings extremely resistant to wear or to provide cutting edges. Thus in the mining and oil industries for example the refractory carbides are attached to parent materials such as rotary cutting bits, finishing tools, etc., by means of a suitable matrix alloy. Generally speaking, the cutting and/or wear and abrasion surfaces produced by these refractory carbides find use in equipment used for drilling, boring, reaming, earth removing, burning shoes, coring tools, bucket teeth, etc.

The refractory carbide particles may be attached to the parent materials by preplacing the particles in loose form on the parent material and then applying the molten matrix alloy by a heat source such as one of the induction type, an oxy-acetylene torch or a high temperature enclosed furnace. Another method of attaching the refractory carbide particles is by the formation of a composite type rod which contains the particles of refractory carbide combined with bonded matrix alloy. In this procedure a heat source such as, for example, an oxy-acetylene torch or the atomic hydrogen process may be used.

In the formation of composite type rods the general procedure has been to place the particles of refractory carbide in a suitable mold and then by application of heat to a rod consisting of the bonding matrix alloy, melt the rod and deposit the matrix alloy around and over the refractory carbide particles. Once coated, the composite rod so formed is removed and is ready for use.

Whether the carbides are preplaced as mentioned originally or whether formed prior to deposition into a composite rod there is a constant danger of affecting the carbide quality. Either of the above processes requires the application of heat. The application of heat can effect carbide quality by cracking of the carbide, oxidation and solution of part of the refractory metal and carbon present in the carbide particle. The solution effect of the refractory metal and the carbon into the matrix alloy and into the parent material detracts from the hardness required and naturally the life of the tool upon which the carbide is attached.

A further problem which exists in producing hard face and/or cutting surfaces whether by preplacing the particles or forming first the composite rod lies in obtaining a dependable fuse of matrix material around each particle and a uniform dispersion of particles within the fusion zone. The carbide particles must be lodged tightly within the matrix alloy so that they will not dislodge during use. The composition must form a tough, resilient and shockproof overlay without the formation of a brittle interface between the carbide particles and the matrix alloy.

It is an object of this invention to produce refractory carbide particles which may be deposited by preplacing the particles on the parent material and applying a suitable matrix alloy or by first forming a composite rod before deposition. It is a further object to produce such particles which are resistant to oxidation, cracking and solution during deposition. It is another object to provide a composite rod which can be deposited by the application of heat from a suitable source which will provide a tough, resilient and shockproof coating on the parent material. Other objects of the invention will become apparent from the following description.

In accordance with this invention, refractory carbides are precoated with a protective covering which thoroughly encompasses the full surface area of each carbide particle. This thoroughly encompassing coating provides a barrier against oxidation, solution and cracking of the refractory carbides during deposition and/or composite rod formation. The precoating material is further chosen so that it is conducive to fluxing action which benefits deposition, not only of the carbide particles involved, but the matrix alloy being employed.

The refractory carbides are precoated according to the invention with a coating composition comprising a suitable binder and a fluxing and protecting agent comprising one or more metal borates and/or boric acid. Metal chlorides and/or metal fluorides may be substituted in part for the metal borates and/or boric acid. The binder used may be of the water soluble type such as a silicate of Na and/or K or it can be of an organic nature such as the acrylic, cellulosic or polyvinyl type.

As suitable borates there may be used the alkali metal borates, for example, sodium, lithium and potassium borates. Also found useful are the alkaline earth metal borates such as calcium, magnesium and barium borates.

As suitable fluorides and chlorides the alkali metal (e.g., sodium, potassium, lithium) and the alkaline earth metal (e.g., magnesium, calcium, barium) fluorides and chlorides have been found useful.

Boric acid in all its forms (e.g., ortho- and tetra-) has been found useful for providing protective precoats according to the invention.

It is further clear that mixtures of one or more of the above materials may be used.

The refractory carbides may be coated according to the invention by various means. Thus a coating formulation comprising solvent, binder and the fluxing and protecting agent is produced in the form of a slurry and the carbides may then be dipped therein. Alternatively the particles may be coated by using a roll process.

If an organic type binder is employed, the carbide particles may be coated and simply air dried to form the precoating by loss of solvent. If a water soluble silicate is used as the binding medium with water as a solvent, the coated carbide particle can be dried by exposing the coated particle to a drying temperature; for example, approximately 250° F. for 15 to 20 minutes.

The precoated refractory carbide particles according to the present invention have been found to be particularly resistant to oxidation, cracking and solution forming when deposited by either the preplaced or composite rod method. Deposition from a preformed composite rod has been found particularly advantageous since the user can form his own rods of the composition he deems necessary according to the ultimate use. According to this method, the precoated refractory carbide particles are placed in a suitable mold. A matrix alloy of the desired composition is then applied over and around the particles and the composite rod is thereby formed. When a parent material is desired to be coated for wear resistant hard facing and/or to provide a cutting surface, the composite rod is then deposited by suitable means. Thus, for example, an oxyacetylene torch with a neutral flame may be used to remelt the matrix alloy and thereby afford deposition. Naturally, since high heat is applied for remelting and deposition of the composite rod the particle may again suffer cracking, oxidation or solution tendencies. The precoated particles find special utility when composite rod deposition is used since the particles are protected from the deleterious effects of high or prolonged heat during the initial formation of the rod and are therefore less likely to be deleteriously effected during ultimate deposition. This is true since once cracking, oxidation or solutioning has begun the particles show a greater tendency to again crack, oxidize or solubilize in the heat of final deposition.

While the precoated particles are highly resistant to cracking, oxidation and solutioning, it has been found particularly advantageous to form the composite rods by the use of successive passes with a flame spray torch. By the use of such a torch, a faster deposit of alloy around the particles results and a lower initial temperature is used. The particles are thus subject to high heat for a shorter period of time and the danger from deleterious effects of heat is reduced. Furthermore, the particles are completely surrounded by the matrix alloy. The composite rod thus formed can then be used to form highly wear resistant, tough, shockproof coatings on the parent metal.

The composite rod may likewise be formed by placing the precoated refractory particles in a suitable mold and then depositing a molten matrix alloy around and over the particles by puddling the molten alloy from a matrix alloy rod heated by, for example, an oxy-acetylene torch.

Suitable molds used to form composite rods by either flame spraying or puddling may be made from such materials as graphite or ceramics. The mold may further be a simple angle iron with the precoated particles placed in the V. The ends of the angle iron may be closed by a suitable jigging material for example. The mold is formed to the dimensions required by the individual user. Generally it is desirable to preheat the mold before application of the matrix alloy.

Refractory carbides which may be precoated according to the invention and used to form wear resistant and/or cutting surfaces include carbides of titanium, zirconium, vanadium, chromium, molybdenum, tungsten, tantalum, and columbium. The refractory carbides may be used alone or in combination with one another. It has been found that tungsten carbide is a particularly preferred refractory carbide. Both cast and sintered carbide particles may be used.

The coating solution used to form the protective coating according to this invention may comprise slurries containing the following constituents in the following percents by weight.

EXAMPLE I

| Constituents | Weight Percent | | |
|---|---|---|---|
| | Broad | Preferred | Example |
| Solvent | 1-40 | 15-40 | 25 |
| Binder | 5-40 | 15-35 | 30 |
| Borate and/or Boric Acid | 20-60 | 25-50 | 35 |
| Fluroide and/or Chloride | 0-25 | 2-15 | 10 |

As suitable examples of coating solutions according to the invention there may further be mentioned the following:

EXAMPLE II

| Constituents | Weight Percent | | |
|---|---|---|---|
| | Broad | Preferred | Example |
| Water | 1.0-40.0 | 20-40 | 30 |
| Silicate Binder | 5.0-35.0 | 15-35 | 30 |
| Borate and/or Boric Acid | 20.0-40.0 | 25-35 | 30 |
| Fluoride and/or Chloride | 0.0-15.0 | 2-12 | 10 |

EXAMPLE III

| Constituents | Weight Percent | | |
|---|---|---|---|
| | Broad | Preferred | Example |
| Solvent | 2.0-35.0 | 15-25 | 20 |
| Organic Binder | 5.0-40.0 | 25-35 | 30 |
| Borate and/or Boric Acid | 20.0-60.0 | 35-50 | 40 |
| Fluoride and/or Chloride | 0.0-25.0 | 5-15 | 10 |

The coating solution is uniformly applied to each carbide particle such as by rolling or dipping and the particles are then dried. The resulting dry coating will have the following constituents in the following percents by weights:

Constituents: Weight percent
Binder _____ 2.5–66
Borate and/or boric acid _____ 20–97.5
Fluoride and/or chloride _____ 0–42

In the case of organic binders the final weight constitution corresponds in general to the composition of the slurrry with the exception of the solvent. Thus the dried coating composition may have the following constituents in the following percentages by weight:

| Constituents | Weight Percent | | |
|---|---|---|---|
| | Broad | Preferred | Example |
| Organic Binder | 5-65 | 30-48 | 48 |
| Borate and/or Boric Acid | 20-90 | 42-66 | 50 |
| Fluoride and/or Chloride | 0-42 | 6-20 | 12 |

In the case of an inorganic binder such as the silicates of sodium or potassium the drying step may not only remove the solvent but the drying temperature, if sufficiently high, likewise may remove the water of hydration. Thus as much as fifty percent of the initial weight percent of the inorganic binder may be lost. The dried coating composition therefore may have the following constituents in the following percentages by weight:

| Constituents | Weight Percent | | |
|---|---|---|---|
| | Broad | Preferred | Example |
| Inorganic Binder | 2.5-66 | 10-65 | 27 |
| Borate and/or Boric Acid | 20-97.5 | 30-65 | 55 |
| Fluorides and/or Chlorides | 0-42 | 2.5-25 | 18 |

Suitable matrix alloys are well known in the art. Generally speaking, matrix alloys having a predominate amount of nickel, iron, copper or cobalt characterized as nickel, iron, cobalt or copper base alloys have been found particularly useful. Copper-nickel alloys have been used for applying overlays to various parent metals. Nickel-silver and other brass types of alloys have further been used. Matrix alloys containing a relatively high zinc content are subject to fuming and vaporization when heat is applied and this constitutes somewhat of a health hazard.

An alloy matrix containing predominantly a metal of the iron-cobalt-nickel group but containing no zinc has been found useful according to this invention. A suitable example of this type of base alloy is as follows:

NICKEL BASE MATRIX ALLOY

| Constituent | Range in Percent by Weight | Example |
|---|---|---|
| Silicon | 1.5–5.0 | 3.0 |
| Boron | 1.5–5.0 | 2.0 |
| Chromium | 0–20 | 1.0 |
| Molybdenum | 0–7 | 0.2 |
| Nickel | Balance | Balance |

The above alloy may be substituted in nickel content by cobalt or iron. The following matrix alloy is also illustrative of composition found useful.

COBALT BASE MATRIX ALLOY

| Constituent | Range in Percent by Weight | Example |
|---|---|---|
| Nickel | 1.0–5.0 | 3.0 |
| Chromium | 26.0–32.0 | 28.0 |
| Silicon | 0.5–3.0 | 1.0 |
| Boron | 1.0–3.0 | 2.0 |
| Carbon | 0.8–2.0 | 1.0 |
| Tungsten | 3.5–7.5 | 4.5 |
| Molybdenum | 0.0–5.0 | 3.0 |
| Cobalt | Balance | 57.5 |

Again, nickel or iron may be substituted in the above formulation for a like amount of cobalt. The iron alloy is harder and more resistant than the others but is more subject to corrosion and oxidation during deposition.

A particularly preferred copper base matrix alloy containing no zinc which has been found useful has the following constituents in percentages by weight as indicated:

COPPER BASE ALLOY

| Constituent | Broad Range | Intermediate Range |
|---|---|---|
| Nickel | 15.0–40.0 | 20–25 |
| Silicon | 1.0–5.0 | 3.0–4.0 |
| Boron | 0.15–2.50 | 0.25–0.5 |
| Manganese | 0.20–2.00 | 0.5–1.0 |
| Copper | Balance | Balance |

As an example of a matrix alloy within the above ranges, there may be mentioned:

Constituents: Percent by weight
  Nickel _____ 23.00
  Silicon _____ 3.45
  Boron _____ 0.47
  Manganese _____ 0.75
  Copper, balance.

As a further variation, it has been found useful to apply the refractory carbide particles according to the invention to the parent material by use of the illustrated copper base alloy. Once this overlay has hardened, a second overlay may be applied thereover by flame spraying refractory carbide particles in the iron, cobalt or nickel base alloys illustrated above. As refractory carbides in this second application cast tungsten carbide particles either coated protectively or non-coated have been found particularly effective. By utilizing this procedure, the user may obtain varying degrees of hardness in the overlay and thus a wide choice becomes available depending on the techniques used and the need arising.

The refractory carbide particles which are precoated according to the invention can be of various sizes depending on the ultimate utility desired. Particle sizes ⁵⁄₁₆″ to ⅜″ and angular in respect to shape are used for superior cutting and drilling performance. Carbide particles in the 20 to 40 mesh range are employed for wear and abrasion resisting applications. The particle size ultimately, however, depends on the discretion of the user and the specific application desired.

The percentage ratios of refractory carbide particles to matrix alloy will again depend on the individual requirements of the user. Naturally, the higher the proportion of carbide particles, the more wear resistant and the better the cutting qualities result. Generally, improvement is noted with as little as 10 percent carbide particles on a weight basis. The upper limit of weight percent carbide particles depends primarily only on having sufficient matrix alloy to firmly bond the particles. As little as 5 percent matrix alloy on a weight basis has been found useful for some applications. Generally a proportion of between 60 and 75 percent carbide particles to 25–40 percent matrix alloy on a weight basis is used.

The carbide particles according to this invention are extremely resistant to oxidation, cracking and solutioning. The particles thus remain hard and do not become brittle. The resulting hard facing or cutting surfaces show outstanding qualities. The fluxing and protecting agents surrounding the particles provide insulation and protection from the high heat caused by contact with molten alloys. The particles are particularly useful when the method of deposition is through a composite rod. Here the particles are subject to heat twice, once to form the rod and once to deposit it. At each application the particles are protected from the deleterious effects of heat.

When coated carbide particles are used to form a composite rod, the resulting particles within the matrix alloy may or may not retain their protective coating. If the molten matrix alloy is applied uniformly over the coated particles in the mold and if a relatively long dwell time of molten matrix alloy is employed, the protecting and fluxing agents will be removed by melting from the particles. In this case the coating has acted both as a protecting and a fluxing agent during rod formation. The resulting particles are now less resistant to the deleterious effects of further heating in ultimate deposition since they have not begun to oxidize, crack or form a solution.

If, however, the composite rod is formed with a short dwell time and if it is formed by a relatively superficial application of molten matrix alloy, some particles of carbide will remain coated. Thus if the rod is formed, for example, by uniformly applying a small portion of alloy to the carbides in the mold, the molten alloy is allowed to solidify, the semi formed rod is turned over and an additional small amount of molten matrix is applied, the so-formed rod then comprises a center core of flux coated particles and a surface coating of carbide particles mechanically entrapped in matrix alloy. During formation the heat generated into the center or core of the rod is sufficient to superficially melt the protecting and fluxing coating on the particles so that upon cooling the particles remain coated but the individual coatings are fused together. The resulting composite rod then comprises a center core of protected carbides, both coated and fused together by the fluxing and protecting coating, the core in turn surrounded by a coating of carbide particles uniformly distributed and entrapped mechanically in the matrix alloy. This composite rod combines the unique features of having not only a center core of protected carbide particles but also being substantially self-fluxing. This is true since the coating composition acts not only to protect the carbides during subsequent deposition but also is a fluxing agent. Thus when the ultimate cutting and/or wearing surface is formed by melting the composite rod no additional flux need be added.

It is, therefore, clear that depending on the ultimate intent of the user, a composite rod according to the invention can be formed which ranges in constitution from a uniform distribution of uncoated particles mechanically entrapped in the matrix alloy to a center core of particles both protected and fused together by the coating, the surface of the core being surrounded by uncoated particles mechanically entrapped in matrix alloy. The thickness of this outer surface is not critical but depends on the ultimate intent of the user. It generally, however, should be sufficiently thick so as to give mechanical strength to the composite rod so that it will not disintegrate during use.

The fluxing and protecting agents not only act to protect the particles but since they are likewise fluxing agents, additional fluxes need not be used. The coated particles provide intimate contact of the particles with fluxing agent. Thus it is insured that the flux will combine with or otherwise render harmless any products of the depositing operation which would interfere with the physical properties of the deposited metal. The hard facing and/or cutting surfaces are thus tough, resilient and shock proof and the carbide particles are lodged tightly within the matrix alloy.

The preferred iron, nickel, copper and cobalt alloys above illustrated further insure that the carbide particles are not subject to oxidation, cracking or solutioning. These alloys have a low melting point and thus the coated particles are not in contact with high temperatures. Furthermore, due to the lack of zinc in these alloys, vaporization and fuming does not occur and the health hazard is thereby reduced.

What is claimed is:

1. A discrete refractory carbide particle the surface of which is encompassed by a coating, said coating comprising a binder and a fluxing and protecting agent selected from the group consisting of boric acid, a metal borate, mixtures thereof and mixtures of said boric acid and metal borates with a member selected from the group consisting of metal fluoride, a metal chloride and mixtures thereof.

2. The refractory carbide particles of claim 1 wherein the coating is a dry coating comprising the following constituents in the following percents by weight:

| Constituents: | Percent by weight |
| --- | --- |
| Binder | 2.5–66 |
| Member selected from the group consisting of boric acid, metal borate and mixtures thereof | 20–97.5 |
| Member selected from the group consisting of metal fluoride, metal chloride and mixtures thereof | 0–42 |

3. The refractory carbide particle of claim 1 wherein the coating is a dry coating comprising the following constituents in the following percents by weight:

| Constituents: | Percent by weight |
| --- | --- |
| Organic binder | 30–48 |
| Member selected from the group consisting of boric acid, metal borate and mixtures thereof | 42–66 |
| Member selected from the group consisting of metal fluoride, metal chloride and mixtures thereof | 6–20 |

4. The refractory carbide particle of claim 1 wherein the coating is a dry coating comprising the following constituents in the following percents by weight:

| Constituents: | Percent by weight |
| --- | --- |
| Inorganic binder | 10–65 |
| Member selected from the group consisting of boric acid, metal borate and mixtures thereof | 30–65 |
| Member selected from the group consisting of metal fluoride, metal chloride and mixtures thereof | 2.5–25 |

5. The refractory carbide particle of claim 1 wherein the refractory carbide is tungsten carbide and the coating is a dry coating comprising the following constituents in the following percent by weight:

| Constituents: | Percent by weight |
| --- | --- |
| Water soluble silicate binder | 10–65 |
| Alkali metal borate | 30–65 |
| Alkali metal fluoride | 2.5–25 |

6. A method of protecting discrete particles of refractory carbides from the deleterious effects of heat comprising coating said particles with a coating composition comprising the following constituents in the following percents by weight:

| Constituents: | Percent by weight |
| --- | --- |
| Solvent | 1–40 |
| Binder | 5–40 |
| Member selected from the group consisting of boric acid, metal borates and mixtures thereof | 20–60 |
| Member selected from the group consisting of metal fluorides, metal chlorides and mixtures thereof | 0–25 | and drying said coating composition.

7. A method of protecting discrete particles of refractory carbides from the deleterious effects of heat comprising coating said particles with a coating composition comprising the following constituents in the following percents by weight:

| Constituents: | Percent by weight |
| --- | --- |
| Solvent | 15–25 |
| Organic binder | 25–35 |
| Member selected from the group consisting of boric acid, metal borates and mixtures thereof | 35–50 |
| Member selected from the group consisting of metal fluorides, metal chlorides and mixtures thereof | 5–15 |

8. A method of protecting discrete particles of refractory carbides from the deleterious effects of heat comprising coating said particles with a coating composition comprising the following constituents in the following percents by weight:

| Constituents: | Percent by weight |
| --- | --- |
| Water | 20–40 |
| Silicate binder | 15–35 |
| Member selected from the group consisting of boric acid, metal borates and mixtures thereof | 25–35 |
| Member selected from the group consisting of metal fluorides, metal chlorides and mixtures thereof | 2–12 |

9. A method of forming an article comprising particles of refractory carbides mechanically entrapped within a matrix alloy comprising applying a matrix alloy selected from the group consisting of nickel, iron, cobalt and copper base alloys to refractory carbide particles the surfaces of which particles are encompassed by a dry coating, said coating comprising a binder and a fluxing and protecting agent selected from the group consisting of boric acid, a metal borate, mixtures thereof and mixtures of said boric acid and metal borates with a member selected from the group consisting of a metal fluoride, a metal chloride and mixtures thereof.

10. The method of claim 9 wherein the article produced is a wearing and cutting surface on a parent metal and the refractory particles are placed on the parent metal and the matrix alloy is applied over and around the refractory particles.

11. The method of claim 9 wherein the article produced is a composite rod suitable for use in depositing wearing and cutting surfaces and the refractory particles are placed in a mold and the matrix alloy is applied over and around the refractory particles.

12. The method of claim 9 wherein the coating is a dry coating having the following constituents in the following weight percents:

| Constituents: | Percent by weight |
|---|---|
| Binder | 2.5–66 |
| Member selected from the group consisting of boric acid, metal borate and mixtures thereof | 20–97.5 |
| Member selected from the group consisting of metal fluoride, metal chloride and mixtures thereof | 0–42 |

13. The method of claim 9 wherein the coating is a dry coating having the following constituents in the following weight percents:

| Constituents: | Percent by weight |
|---|---|
| Organic binder | 30–48 |
| Member selected from the group consisting of boric acid, metal borate and mixtures thereof | 42–66 |
| Member selected from the group consisting of metal fluoride, metal chloride and mixtures thereof | 6–20 |

14. The method of claim 9 wherein the coating is a dry coating having the following constituents in the following constituents in the following weight percents:

| Constituents: | Percent by weight |
|---|---|
| Inorganic binder | 10–65 |
| Member selected from the group consisting of boric acid, metal borate and mixtures thereof | 30–65 |
| Member selected from the group consisting of metal fluoride, metal chloride and mixtures thereof | 2.5–25 |

15. A composite rod for use in depositing wear and cutting surfaces comprising a core of refractory carbide particles the surfaces of which are coated and fused together by a dry binder and a fluxing and protecting agent selected from the group consisting of boric acid, a metal borate, mixtures thereof and mixtures of said boric acid and metal borate with a member selected from the group consisting of metal fluorides, metal chlorides and mixtures thereof, the surface of said core being coated with a matrix alloy containing refractory carbide particles mechanically entrapped therein, said matrix alloy being selected from the group consisting of nickel, iron, cobalt and copper base alloys.

16. The composite rod of claim 15 wherein the refractory carbide particles in the core are coated and fused together by the following constituents in the following weight percents:

| Constituents: | Percent by weight |
|---|---|
| Organic binder | 30–48 |
| Member selected from the group consisting of boric acid, metal borate and mixtures thereof | 42–66 |
| Member selected from the group consisting of metal fluoride, metal chloride and mixtures thereof | 6–20 |

17. The composite rod of claim 15 wherein the refractory carbide particles in the core are coated and fused together by the following constituents in the following weight percents:

| Constituents: | Percent by weight |
|---|---|
| Inorganic binder | 10–65 |
| Member selected from the group consisting of boric acid, metal borate and mixtures thereof | 30–65 |
| Member selected from the group consisting of metal fluoride, metal chloride and mixtures thereof | 2.5–25 |

References Cited
UNITED STATES PATENTS

| 2,684,312 | 7/1954 | Wasserman | 148—24 |
| 2,700,091 | 1/1955 | Culbertson et al. | 148—24 |
| 2,744,011 | 5/1956 | Samuel et al. | 148—24 X |
| 2,998,322 | 8/1961 | Strate | 117—46 |
| 3,028,644 | 4/1962 | Waldrop | 22—202 |
| 3,175,260 | 3/1965 | Bridwell et al. | 22—202 |
| 3,175,932 | 3/1965 | Brady | 148—26 X |

DAVID L. RECK, *Primary Examiner.*

H. F. SAITO, W. W. STALLARD, *Assistant Examiners.*

UNITED STATES PATENT OFFICE
CERTIFICATE OF CORRECTION

Patent No. 3,372,066　　　　　　　　　　　　　　March 5, 1968

Joseph F. Quaas

It is certified that error appears in the above identified patent and that said Letters Patent are hereby corrected as shown below:

Column 8, line 57, "alloys discrete to" should read -- alloy to discrete --.

Signed and sealed this 5th day of August 1969.

(SEAL)
Attest:

Edward M. Fletcher, Jr.　　　　　　　　　　WILLIAM E. SCHUYLER, JR.
Attesting Officer　　　　　　　　　　　　　　Commissioner of Patents